US012723197B2

(12) United States Patent
Lv et al.

(10) Patent No.: US 12,723,197 B2
(45) Date of Patent: Sep. 1, 2026

(54) THREE-DIMENSIONAL HELICAL-ARTIFICIAL-FIBROUS-MUSCLE STRUCTURED TUBULAR SOFT ACTUATOR, MANUFACTURING METHOD THEREFOR AND APPLICATION THEREOF

(71) Applicant: Westlake University, Hangzhou (CN)

(72) Inventors: Jiuan Lv, Hangzhou (CN); Zhiming Hu, Hangzhou (CN)

(73) Assignee: Westlake University, Hangzhou (CN)

( * ) Notice: Subject to any disclaimer, the term of this patent is extended or adjusted under 35 U.S.C. 154(b) by 166 days.

(21) Appl. No.: 18/606,392

(22) Filed: Mar. 15, 2024

(65) Prior Publication Data

US 2024/0218252 A1 Jul. 4, 2024

(30) Foreign Application Priority Data

Jun. 6, 2023 (CN) ......................... 202310667809.9

(51) Int. Cl.
*C09K 19/38* (2006.01)
*B29C 53/58* (2006.01)
(Continued)

(52) U.S. Cl.
CPC .......... *C09K 19/3852* (2013.01); *B29C 53/58* (2013.01); *C08G 75/045* (2013.01); *C09K 19/52* (2013.01); *D01F 6/76* (2013.01)

(58) Field of Classification Search
CPC .... C09K 19/3852; C09K 19/52; B29C 53/58; C08G 75/045; D01F 6/76
See application file for complete search history.

(56) References Cited

U.S. PATENT DOCUMENTS

2018/0291535 A1* 10/2018 Ridley ................. D02G 1/0286
2018/0298925 A1 10/2018 Yang et al.
(Continued)

FOREIGN PATENT DOCUMENTS

CN 106883863 A 6/2017
CN 106883863 B * 10/2018 ............ C08F 222/20
(Continued)

OTHER PUBLICATIONS

Xiao et al., "Synergistic effect of axial-torsional-radial deformation on the multi-strand helical filament artificial muscles, " Applied Mathematical Modelling, vol. 109, 2022, pp. 760-774. (Year: 2022).*
(Continued)

*Primary Examiner* — Jeremy R Pierce
(74) *Attorney, Agent, or Firm* — Hemisphere Law, PLLC

(57) ABSTRACT

Provided is a three-dimensional (3D) helical-artificial-fibrous-muscle structured tubular soft actuator (HAFMS-TSA), a manufacturing method therefor and an application thereof. Fibrous liquid crystal elastomer (LCE) oligomers with weak crosslinked networks formed through chemical crosslinking reactions are mechanically oriented and stretched. The stretched fibrous LCE oligomers are winded onto a 3D mandrel for secondary assembly, then a 3D helical fibrous architecture is obtained, and the contacted fibrous LCE oligomers are bonded through chemical crosslinking reactions. The 3D helical tubular soft actuator is obtained after removing the mandrel. Multimodal reversible deformations of the 3D HAFMS-TSA upon external stimuli can be achieved by adjusting and controlling winding angles, formulations of liquid crystal materials and stretching ratios of the fibers. Advantages of well-defined degrees of design freedom and programmable-adaptive 3D deformations are achieved. The technology has wide application prospects in
(Continued)

the fields of interactive soft robots, soft pumps, artificial muscles, bionic intelligent systems, etc.

6 Claims, 11 Drawing Sheets

(51) Int. Cl.

| | |
|---|---|
| ***C08G 75/045*** | (2016.01) |
| ***C09K 19/52*** | (2006.01) |
| ***D01F 6/76*** | (2006.01) |

(56) References Cited

U.S. PATENT DOCUMENTS

| | | | |
|---|---|---|---|
| 2020/0039065 | A1 | 2/2020 | Manfredi |
| 2023/0378891 | A1 | 11/2023 | Pikul et al. |

FOREIGN PATENT DOCUMENTS

| | | | | | |
|---|---|---|---|---|---|
| CN | 111484854 | A | | 8/2020 | |
| CN | 113802209 | A | * | 12/2021 | ............... D01D 5/12 |
| CN | 114671394 | A | | 6/2022 | |
| JP | H0391718 | A | | 4/1991 | |
| WO | WO-2022246728 | A1 | * | 12/2022 | ............... F03G 7/00 |

OTHER PUBLICATIONS

English translation of CN 106883863 to Ji et al. obtained from PE2E database (Year: 2018).*

English translation of CN 113802209 to Yuan et al. obtained from PE2E database (Year: 2021).*

Hu et al., "Self-winding liquid crystal elastomer fiber actuators with high degree of freedom and tunable actuation," Applied materials today, vol. 27, Jun. 2022, 101449 (Year: 2022).*

English translation of WO-2022246728-A1 to Lv et al. obtained from PE2E database (Year: 2022).*

* cited by examiner

THREE-DIMENSIONAL HELICAL-ARTIFICIAL-FIBROUS-MUSCLE STRUCTURED TUBULAR SOFT ACTUATOR, MANUFACTURING METHOD THEREFOR AND APPLICATION THEREOF

TECHNICAL FIELD

The present disclosure relates to the technical field of functional materials, and particularly relates to a three-dimensional (3D) helical-artificial-fibrous-muscle structured tubular soft actuator (HAFMS-TSA), a manufacturing method therefor and an application thereof.

BACKGROUND

Soft active materials exhibit programmable shapes via encoding “morphing instructions” into their materials and architectures, and can be rationally designed and formed accordingly to offer potential technological applications extremely difficult to address with rigid systems that need many auxiliary components. As a kind of soft active material, liquid crystal elastomers (LCEs) are ideal materials used to manufacture soft actuators because of their large reversible strain and programmable deformation. Nonetheless, achieving programmable deformations in LCEs has proved extremely challenging, especially for 3D hierarchical structures, because it requires both precisely programmed geometric shapes and well-controlled liquid crystal (LC) alignments.

Conventional preparation techniques for LCEs are limited to only fabricate thin, flat 2D films with either uniform or nonuniform LC alignment induced by mechanical stretching, rubbed surfaces, or applied magnetic field. Manufacturing techniques employing a two-step crosslinking process in conjunction with mechanical forces have been widely applied in the production of uniaxially oriented LCEs with linear actuation characteristics. However, these techniques fail to achieve complex patterned LC orientations, thereby limiting achievable morphing modes of the LCEs. Techniques employing external magnetic/electric fields or rubbed surfaces also have similar problems. Although patternable LC orientations can be achieved by using micro-templates or photoalignment pattern surfaces, these functional surfaces are complex and laborious to produce using extremely fine and expensive fabrication equipment. Furthermore, surface alignment techniques can only be used to fabricate extremely thin films (thicknesses less than 50 μm) due to small propagation depths of surface interactions. In recent years, a 3D printing technology based on direct ink writing has provided a multi-functional tool that can shape LCE architectures in flat and 3D patterns. However, the moduli of existing extrudable LCE materials are not mechanical enough to maintain printing paths in a z direction, which limits their printable 3D structures. To prepare 3D tubular LCE structures, preparation techniques that combine molding with mechanical stretching or rubbed alignment layer have been developed. However, these traditional molding-based approaches can only gain simple, uniform LC orientation architecture along their long axis, and tunable 3D geometries and spatial molecular orientation architectures are unavailable, which inevitably leads to single and monotonous morphing behavior (linear contraction).

Therefore, unconventional tubular LCE actuators with tunable 3D geometries and spatial molecular orientation architectures, which can be constructed through a readily accessible, highly efficient, flexible fabrication platform, are urgently needed for full exploitation of the potential of LCEs as compact smart active devices/robots with diverse morphing modes and sophisticated deformations.

SUMMARY

An objective of the present disclosure is to provide a 3D HAFMS-TSA, a manufacturing method therefor and an application thereof. A 3D HAFMS-TSA with locally tunable molecular orientations, materials, mechanics, and actuation is obtained via a modular fabrication platform through a programmable filament winding technique. The HAFMS-TSA can be endowed with 11 different morphing modes through programmable regulation of their 3D helical fibrous architectures.

To achieve the above objective, the solution provides a manufacturing method for a 3D HAFMS-TSA. The method includes steps as follows:

mechanical stretching produces fibrous LCE oligomers with a weak crosslinked network formed through chemical crosslinking reactions; the freshly prepared fibrous precursor is mechanically stretched and directionally, closely winded onto a designed mandrel with a target 3D geometry; functional groups left on the fibers' surface offer chemical anchors for adjoining fibers in contact, enabling self-bonding of the contacted fibers through the chemical reaction and thereby ensuring the mechanical robustness in interface strength without the need for any artificial participation and operations (e.g. gluing); and after the chemical bonding reaction is completed, self-standing, mechanically-robust HAFMS-TSAs are thus obtained after removing the mandrel.

In some examples, LCE materials are formed into fibrous LCE oligomers through a screw mold, a tubular mold, or solution spinning. Weak crosslinked networks are formed within the fibrous LCE oligomers through chemical crosslinking. Specifically, the LCE materials are subjected to enol click reaction, Michael addition reaction, or free radical polymerization, such that the fibrous LCE oligomers are obtained.

In some examples, preliminarily chemically crosslinked fibrous LCE oligomers are mechanically stretched and oriented. Stretching ratios of the fibrous LCE oligomers are increased by increasing stretching forces on the LCE fibrous oligomers.

It should be noted that in some examples, fibrous LCE oligomers having different stretching ratios are winded onto the mandrel, such that a secondary assembly between fibers having different stretching ratios is achieved. In some examples, during winding the fibrous LCE oligomers onto the mandrel, the stretching forces on the fibrous LCE oligomers are gradually increased so that stretching ratios of the fibers formed from the fibrous LCE oligomers are increased. Therefore, the fibers at different positions in a same single tubular actuator can possess varied degrees of orientation. The 3D HAFMS-TSA having a gradient orientation degree can reversibly switch between a symmetric tubular shape and an asymmetric tapered shape by a stimulus. An on-demand diameter change at any desired part of the single actuator can be gained by controllably adjusting the stretching ratio of the fiber during the winding process.

In some examples, the stretched fibrous LCE oligomers are kept winding onto the mandrel until the mandrel's surface is completely covered with a 3D helical fibrous architecture. The 3D helical fibrous architecture can exactly replicate the 3D geometry of the used mandrel.

In some examples, a geometry of the 3D HAFMS-TSA depends on that of the mandrel. A shape of the 3D HAFMS-TSA is one of a circle, a square, a rectangle, a triangle, a semicircle, a rhombus, a trapezoid, a line, and other symmetric geometries, or one of an S shape, a conical shape, a spiral shape, a spindle shape, and other asymmetric geometries. The geometry of the mandrel may be a triangle, a circle, a square, a rectangle, a regular polygon, or an irregular polygon, etc.

In some examples, thiol-functional groups and acrylate groups left on the fibers' surface offer chemical anchors and fix shapes and orientations for adjoining fibers in contact, enabling self-bonding of the contacted fibers through thiol-acrylate click reaction or light/heat-induced free radical polymerization. After the chemical bonding reaction is completed, a self-standing, mechanically robust HAFMS-TSA is thus obtained after removing the mandrel.

In some examples, the 3D HAFMS-TSA can be endowed with 11 different morphing modes upon external stimuli through programmable regulation of its 3D helical fibrous architecture. Specifically, winding modes in which the fibrous LCE oligomers are winded onto the mandrel are regulated, such that winding angles of the fibers at different parts of the 3D HAFMS-TSA are adjusted, enabling programmable regulation of the 3D helical fibrous architecture. The winding angle θ is an included angle between the fiber on the 3D HAFMS-TSA and a long-axis direction of the 3D HAFMS-TSA, and $0° \leq \theta \leq 90°$. In some examples, a combined deformation mode (twisting, axial and radial) of the 3D HAFMS-TSA upon symmetric stimuli is adjusted through programmable regulation of the winding angle. A deformation mode of phototropic twisting or photophobic twisting upon asymmetric stimuli is adjusted through programmable regulation of the winding angle.

When the winding angle θ takes different values, seven morphing modes can be induced upon symmetric stimuli: (a) when $\theta=0°$, the 3D HAFMS-TSA simultaneously generates deformation of axial shortening and radial expansion; (b) when $0°<\theta<$ a first critical boundary value ($\theta_1$), the 3D HAFMS-TSA simultaneously generates deformation of twisting, axial shortening and radial expansion; (c) when $\theta=\theta_1$, the 3D HAFMS-TSA simultaneously generates deformation of twisting and axial shortening while maintaining a constant radial diameter; (d) when $\theta_1<\theta<$ a second critical boundary value ($\theta_2$), the 3D HAFMS-TSA simultaneously generates deformation of twisting, axial shortening and radial shortening; (e) when $\theta=\theta_2$, the 3D HAFMS-TSA simultaneously generates deformation of twisting and radial shortening while maintaining a constant axial length; (f) when $\theta_2<\theta<90°$, the 3D HAFMS-TSA simultaneously generates deformation of twisting, radial shortening and axial elongation; and (g) when $\theta=90°$, the 3D HAFMS-TSA simultaneously generates deformation of radial shortening and axial elongation.

When the winding angle θ takes different values, four morphing modes can be induced upon asymmetric stimuli: (h) when $\theta=0°$, the 3D HAFMS-TSA generates deformation of bending towards a stimulus; (i) when $0°<\theta<\theta_2$, the 3D HAFMS-TSA generates deformation of bending towards the stimulus coupled with controllable twisting; (j) when $\theta_2<\theta<90°$, the 3D HAFMS-TSA generates deformation of bending away from the stimulus coupled with controllable twisting; and (k) when $\theta=90°$, the 3D HAFMS-TSA generates deformation of bending away from the stimulus.

The deformation behavior of the HAFMS-TSA arises from an anisotropic deformation of structural units of helically-arranged active fibers, which can be regarded as a superposition effect of the deformations of the helically-arranged fiber units. The fiber units contract in their longitudinal direction and expand in their radial direction. Similar to an important mechanical feature of muscle fiber of muscular hydrostat, volume of the fibrous building blocks remains constant when deformed, which means any decrease in one dimension will simultaneously lead to a compensatory increase in at least one other dimension. Upon light exposure or equivalently temperature change, a contraction strain ($\varepsilon_c$) in a fiber direction can be decomposed into two orthogonal components, with one along an axial direction of a 3D HAFMS-TSA, and the other along a circumferential direction. Similarly, a radial expansion strain ($\varepsilon_E$) of the fiber unit can also be decomposed into two orthogonal components. Therefore, an overall strain ($\varepsilon_L$) of an axial deformation of a 3D HAFMS-TSA can be described as the superposition of corresponding components of the expansion strain and the contraction strain of the fiber unit, and can be expressed as $\varepsilon_L=\varepsilon_E \sin \theta+\varepsilon_C \cos \theta$. An overall circumferential strain ($\varepsilon_P$) can be denoted as $\varepsilon_p=\varepsilon_E \cos \theta+\varepsilon_C \sin \theta$.

In some examples, a winding angle θ is formed between the fiber and a long-axis direction of the 3D HAFMS-TSA, and two critical boundary values ($\theta_1$ and $\theta_2$) of winding angle are leveraged to achieve decoupling and coupling among radial deformation or axial deformation and deformation in other directions of the 3D HAFMS-TSA in a stimulated deformation process. When $\theta=\theta_1$ or $\theta=\theta_2$, the circumferential strain ($\varepsilon_P$) or the axial strain ($\varepsilon_L$) would be equal to 0 respectively, which means that the HAFMS-TSA with $\theta=\theta_1$ can maintain its diameter constant while the HAFMS-TSA with $\theta=\theta_2$ can keep its length constant during stimuli-responsive deformations. Therefore, the variation of morphing modes can be observed with the adjustment of fiber winding angle. When $0<\theta<\theta_1$, the 3D HAFMS-TSA contracts along its long axis and expands in its circumferential direction, and simultaneously generates twisting deformation. When θ is close to or equal to $\theta_1$, the 3D HAFMS-TSA can maintain its circumference constant meanwhile producing shortening and twisting motion. When $\theta_1<\theta<\theta_2$, the 3D HAFMS-TSA begins to contract in both circumferential direction and axial direction, showing shape changes of axial shortening and radial shortening. When θ is close to or equal to $\theta_2$, a longitudinal length of the 3D HAFMS-TSA can remain constant, and HAFMS-TSA simultaneously generates twisting motion combined with contraction in its circumferential direction. When $\theta_2<\theta<90°$, the 3D HAFMS-TSA elongates along its longitudinal direction while contracting in its circumferential direction. Through the critical fiber winding angles (0°, $\theta_1$, $\theta_2$, and 90°), the decoupling and coupling of diverse deformations can be achieved. When $\theta=0°$ or 90°, the decoupling of twisting from the axial and radial deformations can be achieved. When $\theta=\theta_1$ and $\theta=\theta_2$, the decoupling of the radial deformation from twisting and axial deformation as well as the decoupling of axial deformation from twisting and radial deformation can be realized. In an angular interval divided by these two critical fiber winding angles ($0<\theta<\theta_1$, $\theta_1<\theta<\theta_2$, and $\theta_2<\theta<90°$), the coupling among twisting, axial deformation, radial deformation can be gained.

In some examples, a light source, a temperature source, or a power source is used as a stimulus. Specifically, response light depends on photoresponsive materials of the fibrous LCE oligomers. In some examples, fibrous LCE oligomers having different formulations can be introduced into desired parts of a single HAFMS-TSA, thus realizing spatial programming of the 3D HAFMS-TSA. Illustratively, a multimaterials 3D HAFMS-TSA, half made of near-infrared-responsive LCE fiber, and the other half composed of ultraviolet-responsive LCE fiber, allows for multi-wavelength and local response.

The solution provides a manufacturing method for a 3D HAFMS-TSA in a particular example. The manufacturing method includes steps as follows:

(1) Fibrous LCE oligomers are manufactured, specifically, a mixture containing a liquid crystal monomer and a light-absorbing material undergoes polymerization through bonding or doping in a screw mold, tube mold, or solution spinning machine using enol click reaction, Michael addition reaction, or free radical polymerization, and the fibrous oligomers with incomplete cross-linking of LCE are obtained; and (2) The 3D HAFMS-TSA is manufactured, specifically, the freshly prepared fibrous LCE oligomers are mechanically stretched to obtain fibers having a preset strain, the stretched fibers are winded onto a designed mandrel with a target 3D geometry, a directionally-winded 3D fiber array having the mandrel is maintained and completely cured, and the 3D HAFMS-TSA is obtained after removing the mandrel.

In a second aspect, the solution provides a 3D HAFMS-TSA, which is a 3D helical fibrous architecture formed by tightly winding fibers. The fibers are obtained by mechanically orienting and stretching fibrous LCE oligomers. The fibrous LCE oligomers have weak crosslinked networks formed through chemical crosslinking reactions. The fibers come into contact with each other, self-bonding through chemical bonds, thereby completing secondary assembly.

In some examples, the preliminarily-formed fibers are assembled through winding and weaving, and the contacted fibrous LCE oligomers form new chemical bonds by prolonging chemical reaction time or through light/heat-induced free radical polymerization, so as to complete the secondary assembly.

In some examples, a shape of the 3D HAFMS-TSA is one of a circle, a square, a rectangle, a triangle, a semicircle, a rhombus, a trapezoid, a line, or other symmetric geometries, or one of an S shape, a conical shape, a helical shape, a spindle shape and other asymmetric geometries.

In some examples, the fibers have a cross-sectional area of 0.0001 $cm^2$-100 $cm^2$ and the HAFMS-TSA has a cross-sectional area of 0.001 $cm^2$-100 $cm^2$.

In some examples, the 3D HAFMS-TSA can be endowed with various programmable morphing modes upon external stimuli, that is, combined deformations (axial, radial and/or twisting) upon symmetric stimuli, and phototropic twisting or photophobic twisting upon asymmetric stimuli.

In some examples, assignment of an arrangement mode of uniaxially stretched fibers in the 3D HAFMS-TSA enables programmable molecular orientations and diverse deformation modes upon external stimuli. The deformation modes include: (1) axial shortening and radial expansion; (2) twisting, axial shortening and radial expansion; (3) axial shortening, and twisting while maintaining a constant diameter; (4) axial shortening, radial contraction, and twisting; (5) axial contraction, and radial contraction while maintaining a constant axial length; (6) axial elongation, radial contraction, and twisting; (7) axial elongation and radial contraction; (8) bending towards a stimulus; (9) bending towards the stimulus coupled with controllable twisting; (10) bending away from the stimulus coupled with controllable twisting; and (11) bending away from the stimulus.

In some examples, the 3D HAFMS-TSA responds to light, heat, electricity, humidity, pondus hydrogenii (pH) value, etc. Light-to-heat conversion materials doped in the fibrous LCE oligomers are graphene, and the graphene can convert light into heat under irradiation of near-infrared (NIR) light, such that deformation is achieved. Similarly, light-to-heat conversion materials with varied wavelengths can be introduced into the fibrous LCE oligomers, such that the fibrous LCE oligomers can deform in a case of lights having other wavelengths. Alternatively, the fibrous LCE oligomers can deform directly through the stimulation of a heat source or by generating an electrothermal effect.

In a case that the stimulus is light, the morphing mode of the 3D HAFMS-TSA can be controlled by adjusting a light intensity and a size of a spot radiation region. In this case, the light source is any one of ultraviolet (UV) light, visible light, red light, and NIR light. Moreover, the light source can be arbitrarily moved, and its spot size and intensity are adjustable, with a light intensity of 0.01 W $cm^{-2}$-100 W $cm^{-2}$.

In the example, NIR-absorbing graphene is used as the light-to-heat conversion material, which has an excellent light-to-heat conversion effect and requires low light intensity. In cases of other light absorbers or reduction in a doping amount of graphene, the required light intensity will be different. In the morphing modes described in the example, the morphing modes of different 3D HAFMS-TSAs can be adjusted by adjusting alignment angles of fibers and light source irradiation regions.

In some examples, as shown in FIG. 1, a winding angle $\theta$ is formed between the fiber and a long-axis direction of the 3D HAFMS-TSA, and $0° \leq \theta \leq 90°$. When the winding angle $\theta$ takes different values, seven morphing modes can be induced upon symmetric stimuli: (a) when $\theta=0°$, the 3D HAFMS-TSA simultaneously generates deformation of axial shortening and radial expansion; (b) $0°<\theta<$a first critical boundary value ($\theta_1$), the 3D HAFMS-TSA simultaneously generates deformation of twisting, axial shortening and radial expansion; (c) when $\theta=\theta_1$, the 3D HAFMS-TSA simultaneously generates deformation of twisting and axial shortening while maintaining a constant radial diameter; (d) when $\theta_1<\theta<$a second critical boundary value ($\theta_2$), the 3D HAFMS-TSA simultaneously generates deformation of twisting, axial shortening and radial shortening; (e) when $\theta=\theta_2$, the 3D HAFMS-TSA simultaneously generates deformation of twisting and radial shortening maintaining a constant axial length; (f) when $\theta_2<\theta<90°$, the 3D HAFMS-TSA simultaneously generates deformation of twisting, radial shortening and axial elongation; and (g) when $\theta=90°$, the 3D HAFMS-TSA simultaneously generates deformation of radial shortening and axial elongation.

When the winding angle $\theta$ takes different values, four morphing modes can be induced upon asymmetric stimuli: (h) when $\theta=0°$, the 3D HAFMS-TSA generates bending towards a stimulus; (i) when $0°<\theta<\theta_2$, the 3D HAFMS-TSA generates bending towards the stimulus coupled with controllable twisting; (j) when $\theta_2<\theta<90°$, the 3D HAFMS-TSA generates bending away from the stimulus coupled with controllable twisting; and (k) when $\theta=90°$, the 3D HAFMS-TSA generates bending away from the stimulus.

In some examples, the fibers on the 3D helical fibrous architecture have different stretching ratios. The stretching ratios of the fibers can be adjusted by adjusting mechanical stretching forces applied to the fibrous LCE oligomers. In this case, a 3D HAFMS-TSA with a tunable LC orientation degree can be obtained. The 3D HAFMS-TSA structure, which possesses a gradient orientation degree, can undergo reversible switching between a symmetric tubular shape and an asymmetric tapered shape in response to a stimulus. An on-demand diameter change at any desired part of a single actuator can be gained by controllably adjusting the stretching ratio of the fiber during winding.

In some examples, the fibers in different sections of the 3D helical fiber architecture are created by incorporating different responsive LCE materials. The 3D HAFMS-TSA thus enables multi-wavelength and local responses. In this way, a material-programmable 3D HAFMS-TSA can be obtained. Specifically, the fibers of the fibrous LCE oligomers having different functions are alternately assembled, such that the 3D HAFMS-TSA is obtained. Further, a 3D HAFMS-TSA that responds to multiple types of stimulation through a single soft actuator will be achieved. In addition, fibrous LCE oligomers with different functional components distributed in a segmented manner can be manufactured. A 3D HAFMS-TSA with different functional components distributed in a segmented manner can be obtained through fiber assembly, such that materials are spatially programmed.

In some examples, numerous 3D HAFMS-TSAs assemblies can be assembled to construct a bundle of 3D helical tubular actuators.

Reference may be made to the content of Example 1 for a manufacturing method for a 3D HAFMS-TSA, which will not be described herein.

In a third aspect, the solution provides an application of the above 3D HAFMS-TSA, which may be applied to a robotic tentacle. Therefore, an object can be grasped and twisted in a complex environment.

Specifically, the solution provides a method for grasping and twisting an object through contraction of a photo-driven 3D HAFMS-TSA. The method includes steps as follows: moving a 3D HAFMS-TSA close to a to-be-grasped object; irradiating one end of the 3D HAFMS-TSA close to the to-be-grasped object with light so as to drive the 3D HAFMS-TSA at the end to contract and grasp the to-be-grasped object; and irradiating continuously the 3D HAFMS-TSA to generate twisting, and transmitting a twisting force to the object to twist and grasp the object. With flexibility, the 3D HAFMS-TSA may also be used in a complex environment. For instance, the actuator may grasp an object in a curved pipe.

In some examples, a fiber angle of the 3D HAFMS-TSA is 10°-90°, preferably 30°-60°, in which the 3D HAFMS-TSA has a great twisting angle.

Moreover, an internal shape of the 3D helical tubular soft actuator is a triangle, a circle, a semicircle, a trapezoid, a rectangle, or other polygons.

Correspondingly, the solution provides a method for grasping an object by a photo-driven 3D helical tubular soft actuator as an artificial muscle. A specific grasping method is adjusted according to grasp paths of different objects in practice. Illustratively, if the artificial muscle is used to grasp a bolt, the method includes steps as follows: grasping the bolt through photo-driven radical contraction and unscrewing it in a straight state, but also exerting torque to the bolt in its curved states, even adapting to a meandering pipe to unscrew the bolt through photo-driven twisting motion although the multiple parts of the tentacle are curved.

Compared with the prior art, the proposed technical solution exhibits the following features and advantages:

An orientation direction, an orientation degree, and a material of the 3D HAFMS-TSA constructed through a programmable filament winding technique can be programmed. A long-standing difficulty that this kind of material cannot combine 3D shaping and programmable orientation is overcome. A 3D HAFMS-TSA with locally tunable molecular orientations, materials, mechanics, and actuation via a modular fabrication platform using a programmable filament winding technique. The 3D HAFMS-TSA can generate various morphing modes (elongation, shortening, bending, twisting, etc.) upon external stimuli. In addition, not only a conventional morphing mode can be achieved independently, but also various morphing modes can be coupled and decoupled. Various methods are provided to accurately adjust complex deformations of the 3D HAFMS-TSA. The filament winding technique for a 3D HAFMS-TSA has a well-defined degree of design freedom and a programmable and adaptive 3D morphing architecture, providing countless possibilities for development of a controllable multimodal compact actuator that can be widely applied to emerging technologies.

DETAILED DESCRIPTION OF THE EMBODIMENTS

Figure 1:
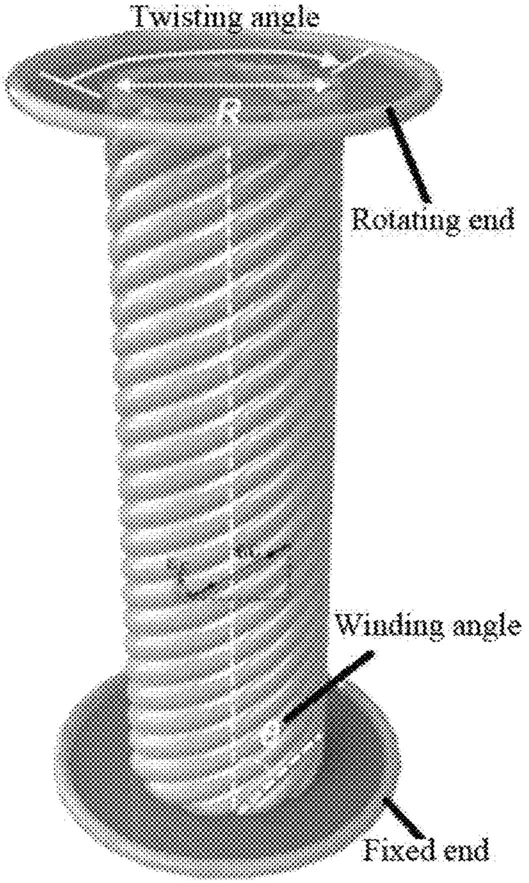
FIG. 1 is a schematic diagram of a 3D HAFMS-TSA constructed by assembling fibers according to the present disclosure.

The technical solutions of examples of the present disclosure will be clearly and completely described below in combination with the accompanying drawings herein. Apparently, the described examples are merely some examples rather than all examples of the present disclosure. All other examples derived by those of ordinary skill in the art based on examples of the present disclosure all fall within the scope of protection of the present disclosure.

Those skilled in the art should understand that in disclosures of the present disclosure, the orientational or positional relations indicated by the terms “longitudinal”, “transverse”, “upper”, “lower”, “front”, “rear”, “left”, “right”, “vertical”, “horizontal”, “top”, “bottom”, “inner”, “outer”, etc. indicate orientational or positional relations based on those shown in accompanying drawings only for ease of description of the present disclosure and for simplicity of the description, and are not intended to indicate or imply that the referenced device or element must have a particular orientation and be constructed and operated in a particular orientation, and therefore cannot be construed as a limitation to the present disclosure.

It can be understood that the term “one” should be interpreted as “at least one” or “one or more”. That is, there may be one element in an example, but may be a plurality of the elements in another example. The term “one” cannot be interpreted as limiting the number.

The solution provides a programmable 3D HAFMS-TSA, a manufacturing method therefor and a practical application thereof. In the solution, the 3D HAFMS-TSA is manufactured from LC polymer materials doped or bonded with light absorbers. Molecular orientations, materials, mechanics, and actuation of LCE fibers are tunable such that a 3D HAFMS-TSA having a programmable shape and deformation can be manufactured and complex deformations can be achieved. By adjusting an intensity and a size of an external stimulus, the 3D HAFMS-TSA can have a plurality of complex morphing modes. The deformation modes include: (1) axial shortening and radial expansion; (2) twisting, axial shortening and radial expansion; (3) axial shortening, and twisting while maintaining a constant diameter; (4) axial shortening, radial contraction, and twisting; (5) axial contraction, and radial contraction while maintaining a constant axial length; (6) axial elongation, radial contraction, and twisting; (7) axial elongation and radial contraction; (8) bending towards the stimulus; (9) bending towards the stimulus coupled with controllable twisting; (10) bending away from the stimulus coupled with controllable twisting; and (11) bending away from the stimulus. And different response methods are combined. If the stimulus is a light, optical control means (remote, instantaneous and spatial control, and an adjustment of light intensity, spot shape, light irradiation position, the number of spots and incident light angle) can be utilized In addition, one-dimensional fiber bundles, two-dimensional films/nets and 3D complex structures can also be manufactured through mutual contact and bonding of the fibers. This novel method for manufacturing a 3D HAFMS-TSA has considerable potential application value in the fields of micro-mechanical systems, micro-fluids, soft robots, etc.

Correspondingly, the 3D HAFMS-TSA can be stimulated by a light source, a temperature source, or a power source in the solution. In a case that the stimulus is a light source, an illumination intensity, an illumination position or a size of a light spot region of the light source is adjusted, such that the 3D HAFMS-TSA is controlled. In a case that the stimulus is a temperature source, a temperature or an illumination region of the temperature source is adjusted, such that the 3D HAFMS-TSA is controlled. In a case that the stimulus is a power supply, power intensity or a drive region of the power supply is adjusted, such that the 3D HAFMS-TSA is controlled.

The following examples provide a manufacturing method for a 3D HAFMS-TSA in the solution. The manufacturing method includes steps as follows:

1) Fibrous LCE oligomers were manufactured, specifically, a mixture monomer was dissolved in a solvent to obtain a mixed solution, where the mixture monomer was an LC monomer containing acrylate groups, a crosslinking agent containing thiol groups and various stimuli-responsive functional components, and a ratio of acrylate groups to the thiol groups in the mixture monomer was (0.8-1.4):1; a catalyst was added and oscillation was carried out to obtain a precursor solution after ultrasonic dispersion; and the precursor solution was processed and formed into the fibrous LCE oligomers through solution spinning or mold processing.

2) the 3D HAFMS-TSA was manufactured, specifically, the freshly prepared fibrous precursor was mechanically stretched to gain fibers having a preset strain, the stretched fibers were winded onto a designed mandrel with a target 3D geometry, a directionally-winded 3D fiber array having the mandrel was maintained and completely cured, and the 3D HAFMS-TSA was obtained after removing the mandrel.

That is, the 3D HAFMS-TSA manufactured in the solution was achieved through a two-step method. Firstly, LC monomers were formed into fibrous LCE oligomers through a mold or solution spinning. The fibrous LCE oligomers had weak crosslinked networks formed through chemical crosslinking reactions. After initial curing, fibrous LCE oligomers that were formed but not completely crosslinked were mechanically stretched, such that LC mesogens were arranged in a direction of an external force. Under action of an external force, the stretched fibers were winded onto a mold, such that the fibers came into contact with each other and were further crosslinked. In this process, not only an orientation of the LC mesogens in the fibers was fixed, but also the contacted fibers were self-bonded together by chemical bonds. After the mold was removed, the 3D HAFMS-TSA with the LC mesogens directionally arranged can be obtained.

In step 1) of manufacturing fibrous LCE oligomers,

The mixture containing an LC monomer and a light-absorbing material underwent polymerization through bonding or doping in a screw mold, tube mold, or solution spinning machine using enol click reaction, Michael addition reaction, or free radical polymerization, and the fibrous oligomers with incomplete crosslinking of LCE were obtained.

Figure 2:
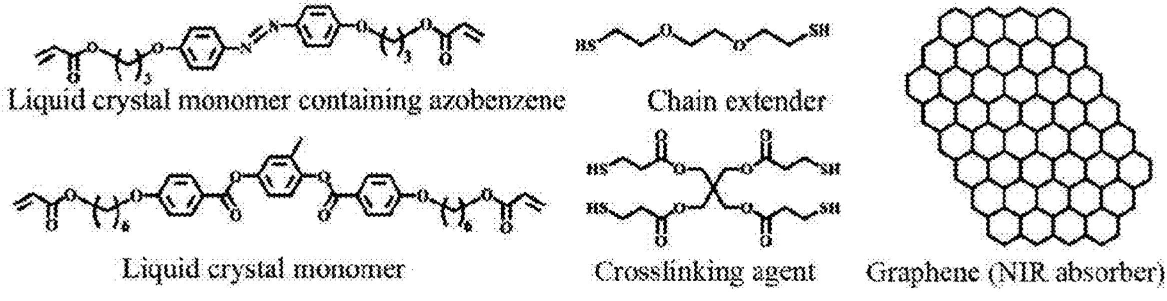
FIG. 2 shows structural formulas of materials for manufacturing a 3D HAFMS-TSA according to an example of the present disclosure.
Figure 3:
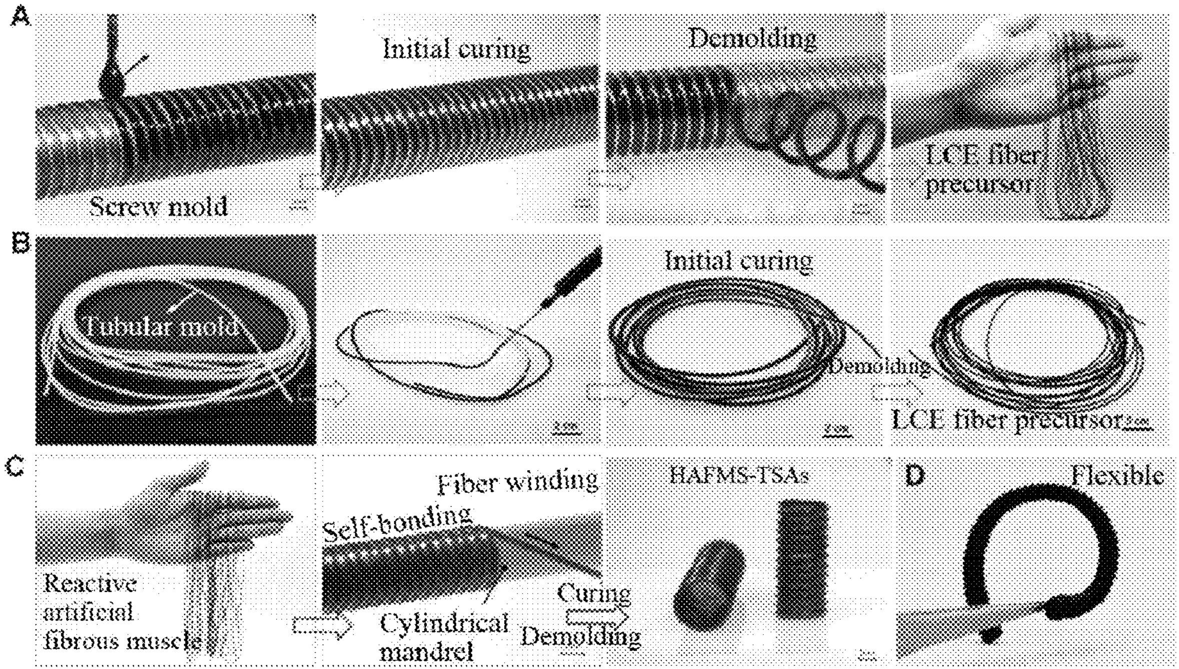
FIG. 3 is a schematic diagram of a manufacturing method for a 3D HAFMS-TSA according to the present disclosure.

In an example of the solution, weak crosslinked LC polymer elastomers were obtained by polymerization through enol click reactions. RM82 was used as the LC monomers containing acrylate groups. 3,6-Dioxa-1,8-octanedithiol (DODT), pentaerythritol tetrakis (3-mercapto-propionate) (PETMP) were used as the monomers containing thiol groups, graphene, azobenzene or no other components were used as functional materials. In this case, a corresponding 3D soft actuator can respond to NIR, UV and temperature. A molar ratio of RM82 to DODT was 1.67:1, a molar ratio of DODT to PETMP was 3:1, a mass ratio of graphene was 2%, and a proportion of azobenzene LC monomers was 5%. Their specific chemical formulas were as shown in FIG. 2. Corresponding manufacturing flows were as shown in FIG. 3.

In the step of “a catalyst was added and oscillation was carried out to obtain a precursor solution after ultrasonic dispersion of the mixed solution”, time of the ultrasonic dispersion may be 0.5 h-10 h, and was 4 h in the solution. In addition, in an example of the solution, 2 wt % dipropylamine (DPA) was used as the catalyst. Dipropylamine, hexylamine (HexAM), triethylamine (TEA), N,N,N',N'-Tetramethyl-1,8-Naphthalenediamine (PS), 1,8-Diazabicyclo (5.4.0)undec-7-ene, 1,8-diazabicyclo(5.4.0)undec-7-ene (DBU), and 1,5-Diazabicyclo(4.3.0)non-5-ene may also be used as the catalyst. There may be various catalysts. In the solution, the more efficient DPA was used as the catalyst, and other catalysts were also applicable.

The fibrous LCE oligomers may be manufactured through a continuous spinning method, a mold forming method, etc. In an example of the solution, two molding methods were used to obtain the fibrous LCE oligomers: 1) an LCE fiber precursor was obtained by a tubular mold; and 2) the fibrous LCE oligomers were obtained by filling LC mixtures with a thread mold. The fibrous LCE oligomers may be in any shape, and the fibers had a cross-sectional area of 0.0001 $cm^2$-100 $cm^2$. In an example of the solution, reaction time at room temperature may be 1 h-3 h, and preferably 2 h.

In step 2) of manufacturing the 3D HAFMS-TSA, the fibrous LCE oligomers were stretched by 0%-100%, the fibrous LCE oligomers were winded onto a mold, and a secondary reaction was induced by prolonging chemical reaction time (12 h-72 h) in a chemical reaction kinetics process and through light/heat-induced free radical polymerization, such that the LC mesogens were fixed, and the fibers were bonded to each other. In an example of the solution, the fibrous LCE oligomers were stretched by 0%, 25%, 50% and 75%. In an example of the solution, the LC mesogens were fixed and the fibers were bonded to each other by prolonging chemical reaction time in a chemical reaction kinetics process, and the time of the secondary chemical reaction is 24 h.

The solution provides examples as follows:

Manufacture Example 1

Figure 4:
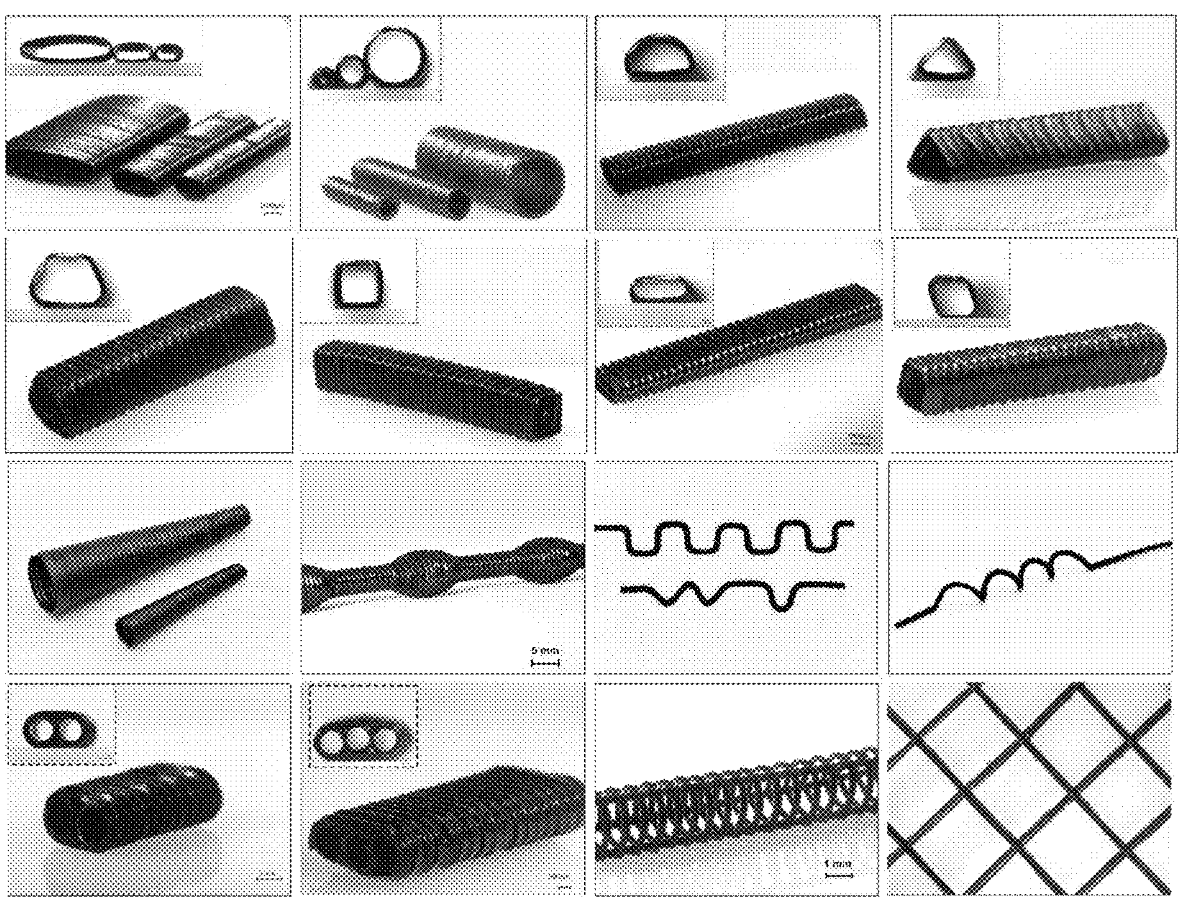
FIG. 4 shows 3D HAFMS-TSAs manufactured according to a method in the present disclosure.

According to molar ratios of RM82 to DODT of 1.67:1 and DODT to PETMP of 3:1, a mass ratio of graphene of 2%, and a ratio of acrylate groups to thiol groups of 1:1, monomers were mixed and dissolved in chloroform. After ultrasonic dispersion was carried out for 4 h, 2 wt % DPA as a catalyst was added into a mixed solution. After oscillation and dissolution were carried out, a thread mold or silicone tube mold was filled with a precursor solution. After a reaction was carried out at room temperature for 2 h, fibrous LCE oligomers that were incompletely crosslinked were carefully peeled off the mold. The manufactured fibers that were incompletely crosslinked were mechanically stretched, such that stretching strain was 50%. The stretched fibers were winded onto different molds, such that 3D HAFMS-TSAs in different shapes were obtained. A shape of the mold may be a triangle, a square, a circle, a rectangle, a semicircle, a trapezoid, or a polygon, etc. A form of the mold may be helical, conical, spindle, bent, or other irregular forms, etc. Manufacturing processes were as shown in FIG. 3, and the manufactured 3D HAFMS-TSAs were as shown in FIG. 4.

Manufacture Example 2

Figure 5:
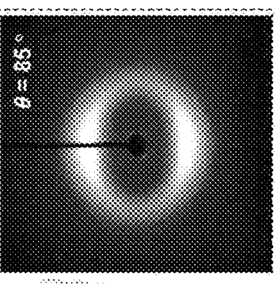
FIG. 5 shows 3D HAFMS-TSAs having controllable orientation directions manufactured according to the present disclosure.
Figure 5:
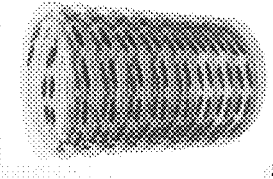
Figure 5:
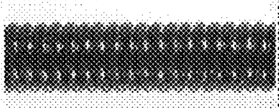
Figure 5:
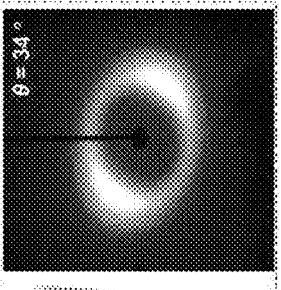
Figure 5:
Figure 5:
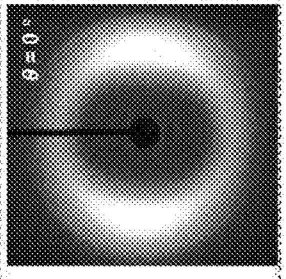
Figure 5:
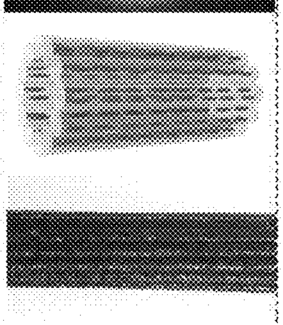

To obtain an LC orientation direction of programmed arrangement in the 3D HAFMS-TSA, a winding angle of the fibrous LCE oligomer manufactured in Example 1 was adjusted during the winding process. A morphing mode of the 3D HAFMS-TSA could be directionally controlled by adjusting the winding angle during the winding process. In the example, a fiber angle of the 3D HAFMS-TSA was 0°-88°, and the 3D HAFMS-TSAs having different winding angles were as shown in FIG. 5.

Manufacture Example 3

Figure 6:
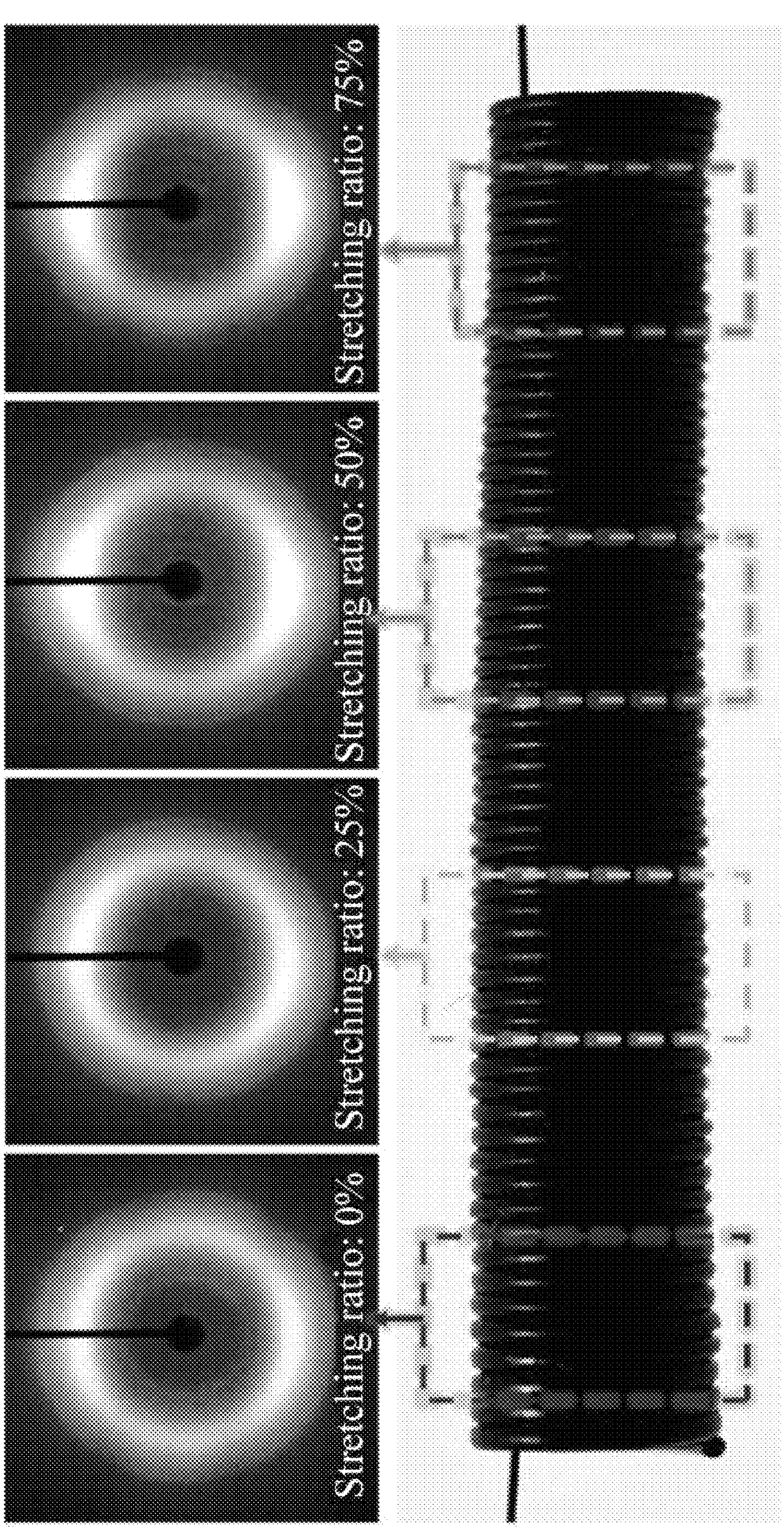
FIG. 6 shows a 3D HAFMS-TSA having a controllable orientation degree manufactured according to the present disclosure.

To obtain a gradient LC orientation in the 3D HAFMS-TSA, a fiber precursor of the fibrous LCE oligomer in Manufacture Example 1 was subjected to different stretching forces during the winding process. By gradually increasing the stretching forces on the fibrous LCE oligomers, stretching ratios of the fibrous LCE oligomers were gradually increased. Therefore, LC orientation degrees of the winded 3D HAFMS-TSA in its longitudinal direction were gradually increased. By adjusting the stretching ratios of fibers during the winding process, orientation degrees of local LC mesogens could be controlled as required. Therefore, locally tunable deformation (such as radial deformation and twist deformation) at any desired part of a single 3D HAFMS-TSA was achieved. The manufactured 3D HAFMS-TSA having a gradient orientation was as shown in FIG. 6.

Manufacture Example 4

Figure 7:
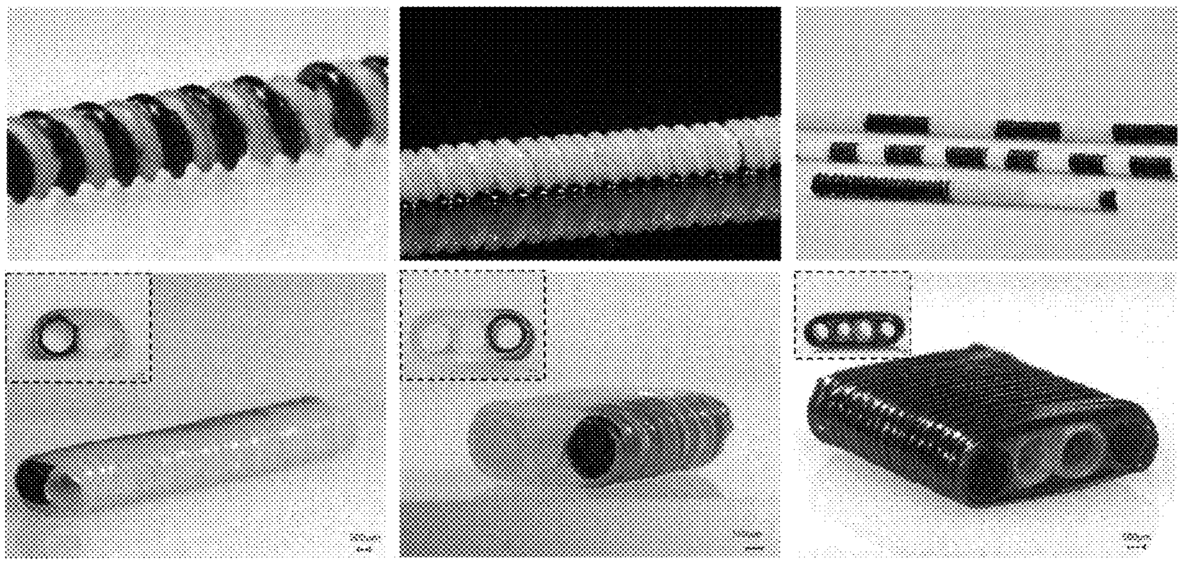
FIG. 7 shows 3D HAFMS-TSAs having programmable materials manufactured according to the present disclosure.

To achieve locally tunable materials in a single 3D HAFMS-TSA, fibrous LCE oligomers having locally-variable material compositions must be manufactured first. Firstly, a chloroform mixture solution having a molar ratio of RM82 to DODT of 1.67:1, a molar ratio of DODT to PETMP of 3:1, a molar ratio of graphene of 2 wt %, and a DPA catalyst content of 2% was injected into a screw mold to fill half recesses of the screw mold. Then, another solution of another mixture (chloroform mixture having a molar ratio of RM82 to DODT of 1.67:1, a molar ratio of DODT to PETMP of 3:1, a molar ratio of photoresponsive azobenzene monomers of 5 wt %, and a DPA catalyst content of 2%) was injected into the other half of the screw mold to fill the remaining recesses. After low crosslinking curing was carried out for 2 h, half fiber precursors composed of NIR-responsive LCEs and half fiber precursors composed of UV-responsive LCEs were formed. The manufactured helical fibers that were not completely crosslinked were stretched and untwisted, such that linear fibers were obtained. The linear fibers were continuously stretched by 50% and were winded onto a cylindrical mold. After fixation was carried out for 24 h, the mold was removed, and a 3D HAFMS-TSA composed of half NIR-responsive LCEs and half UV-responsive LCEs was obtained. The manufactured 3D HAFMS-TSAs were as shown in FIG. 7.

Specifically, specific photo-control experiments were carried out on the 3D HAFMS-TSAs obtained in Manufacture Examples 1-4 as instances, and examples were described with a light source as a stimulus.

Figure 8:
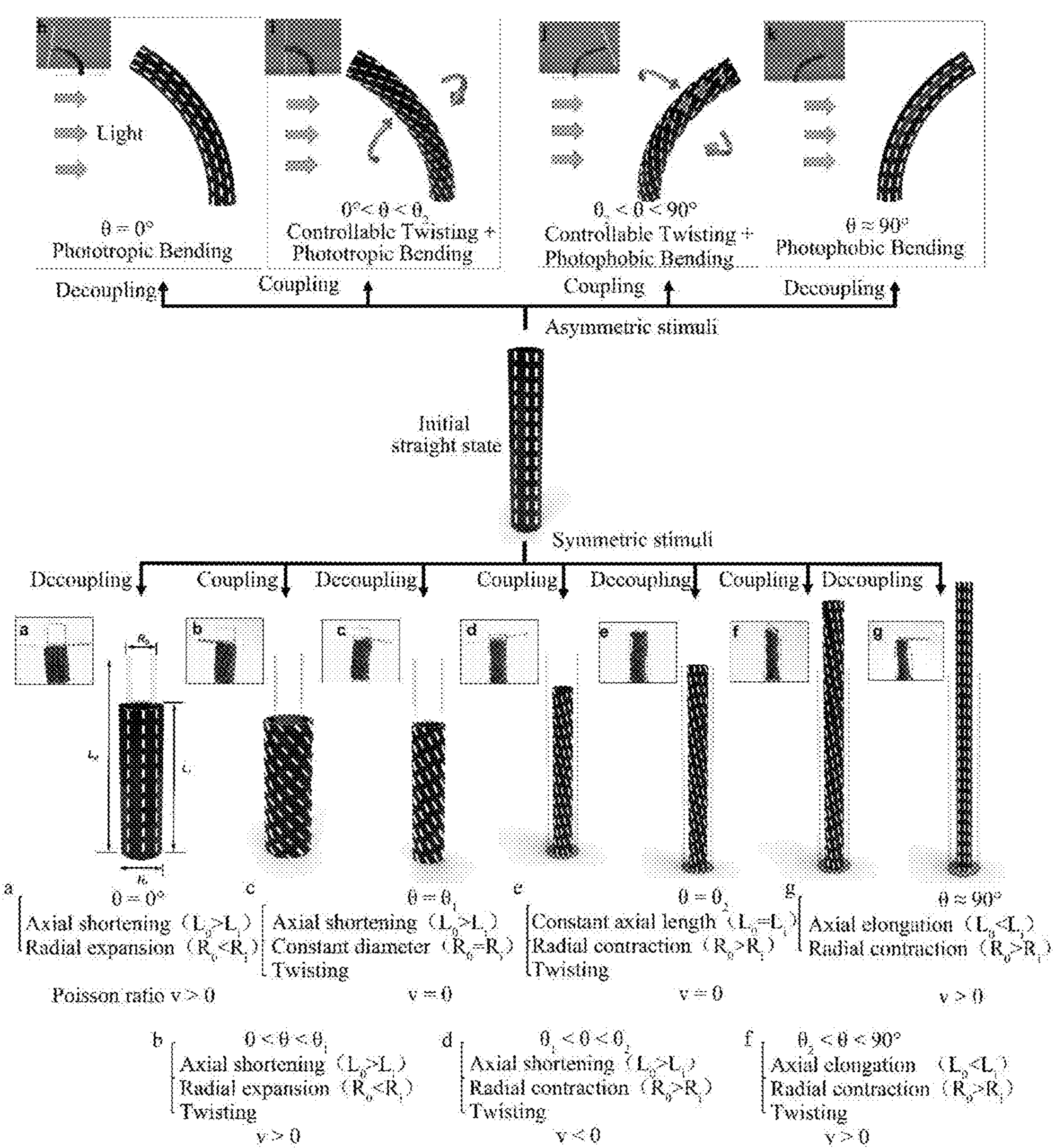
FIG. 8 shows a reversible deformation of a 3D HAFMS-TSA having a controllable orientation direction manufactured according to the present disclosure under stimulation of adjustable light.

Example 1: a 3D HAFMS-TSA Obtained Through Photo-Control Fiber Assembly had a Plurality of Morphing Modes 3D HAFMS-TSAs having different fiber angles were stimulated by NIR, and a light source was adjusted to carry out unilateral face stimuli and bilateral symmetrical face stimuli. Under the condition that the light intensity was 1.5 W $cm^{-2}$ and under irradiation of bilateral symmetrical face stimuli, in a case that the fiber angle was 0°, deformation of axial shortening and radial expansion occurred. In a case that the fiber angle was 31°, deformation of twisting, axial shortening and radial expansion occurred. In a case that the fiber angle was 52°, deformation of axial contraction, and twisting while maintaining a constant diameter occurred. In a case that the fiber angle was 56°, deformation of axial shortening, radial contraction, and twisting occurred. In a case that the fiber angle was 60°, deformation of axial contraction, and radial contraction while maintaining a constant axial length occurred. In a case that the fiber angle was 75°, deformation of axial elongation, radial contraction, and twisting occurred. In a case that the fiber angle was 86°, deformation of axial elongation and radial contraction occurred. Under the condition that the light intensity was 1.5 W $cm^{-2}$ and under irradiation of unilateral face stimuli, in a case that the fiber angle was 0°, bending towards the stimulus occurred. In a case that the fiber angle was 40°, bending towards the stimulus coupled with controllable twisting occurred. In a case that the fiber angle was 75°, bending away from the stimulus coupled with controllable twisting occurred. In a case that the fiber angle was 86°, bending away from the stimulus occurred, and results were as shown in FIG. 8.

Example 2: a 3D HAFMS-TSA Obtained Through Photo-Control Fiber Assembly had Gradient Deformation The 3D HAFMS-TSA having a gradient orientation obtained in Manufacture Example 3 was manufactured through stimulation of NIR. NIR light was radiated onto the 3D HAFMS-TSA having a gradient orientation.

Figure 9:
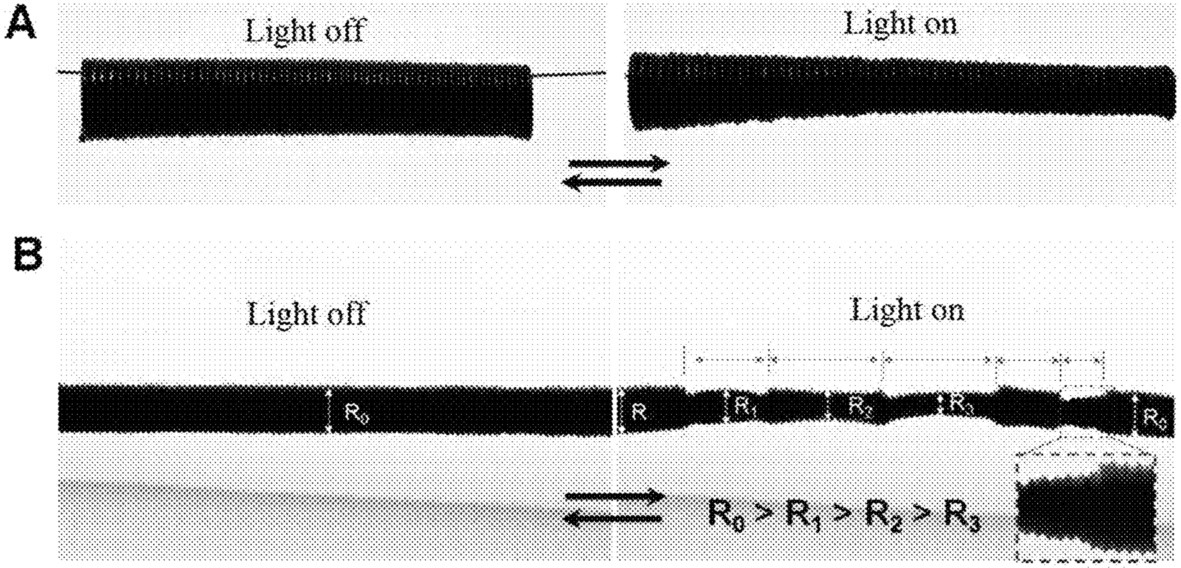
FIG. 9 shows a reversible deformation of a 3D HAFMS-TSA having a controllable orientation degree manufactured according to the present disclosure under stimulation of NIR.

Results were as shown in FIG. 9, a symmetric 3D HAFMS-TSA underwent asymmetric constriction after irradiation. The same 3D HAFMS-TSA had a plurality of deformation degrees due to inconsistent orientation degrees. The NIR has an intensity of 1.5 W $cm^{-2}$.

Example 3: a Multi-Material-Programmed 3D HAFMS-TSA Reversibly Switched Between Structures Under Photostimulation The 3D HAFMS-TSA obtained in Manufacture Example 4 that was half NIR-responsive and half UV-responsive was irradiated with NIR light, UV light, and both. In addition, a material-programmed HAFMS-TSA composed of alternating non-photoresponsive and photoresponsive LCE materials was irradiated with NIR light. The NIR light had an intensity of 1.5 W $cm^{-2}$, and the UV light had an intensity of 550 mW $cm^{-2}$.

Figure 10:
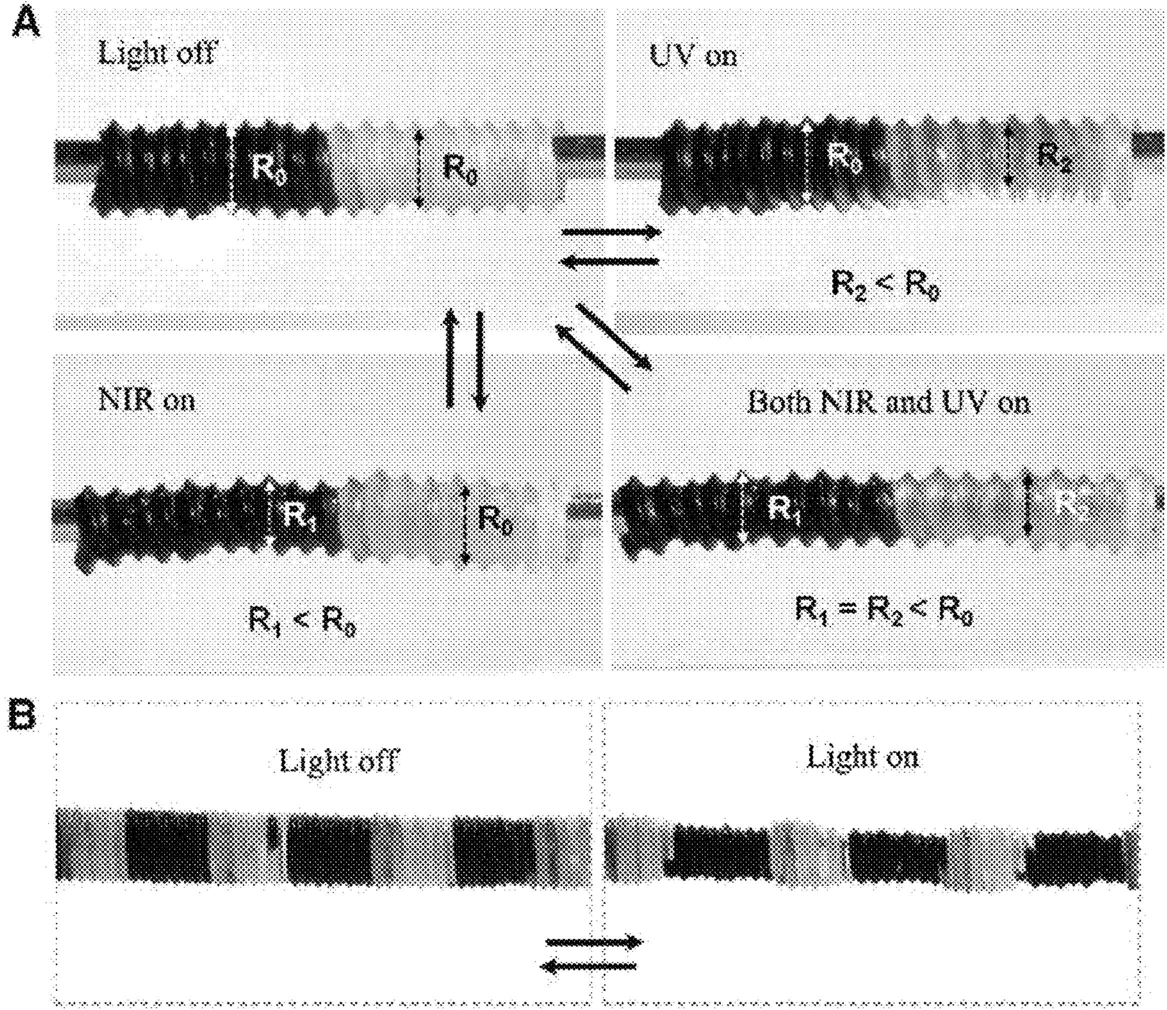
FIG. 10 shows a reversible deformation of a 3D HAFMS-TSA composed of different materials manufactured according to the present disclosure under stimulation of lights having different wavelengths.

Results were as shown in FIG. 10. Under irradiation of NIR light or UV light, the diameter of the 3D HAFMS-TSA was locally changed. Under simultaneous irradiation of NIR light and UV light, the diameter of the 3D HAFMS-TSA was entirely changed. Similarly, the 3D HAFMS-TSA composed of non-photoresponsive and photoresponsive LCE materials reversibly switched between a cylindrical structure and a pearl-necklace-like structure by light.

Example 4: a 3D HAFMS-TSA was Taken as a Small-Scale Soft-Robotic Tentacle

The soft-robotic tentacle was composed of a 3D HAFMS-TSA having a fiber angle of 40°. A bolt was placed at a lower end of the 3D HAFMS-TSA. A segment wrapping the bolt of the 3D HAFMS-TSA was slowly moved. A bottom of the 3D HAFMS-TSA was irradiated with NIR light first, and then other parts of the 3D HAFMS-TSA were irradiated, such that a twisting force was generated. The NIR light had an intensity of 2.0 W $cm^{-2}$, and the 3D HAFMS-TSA had an inner diameter of approximately 3 mm and a length of approximately 8 cm.

Figure 11:
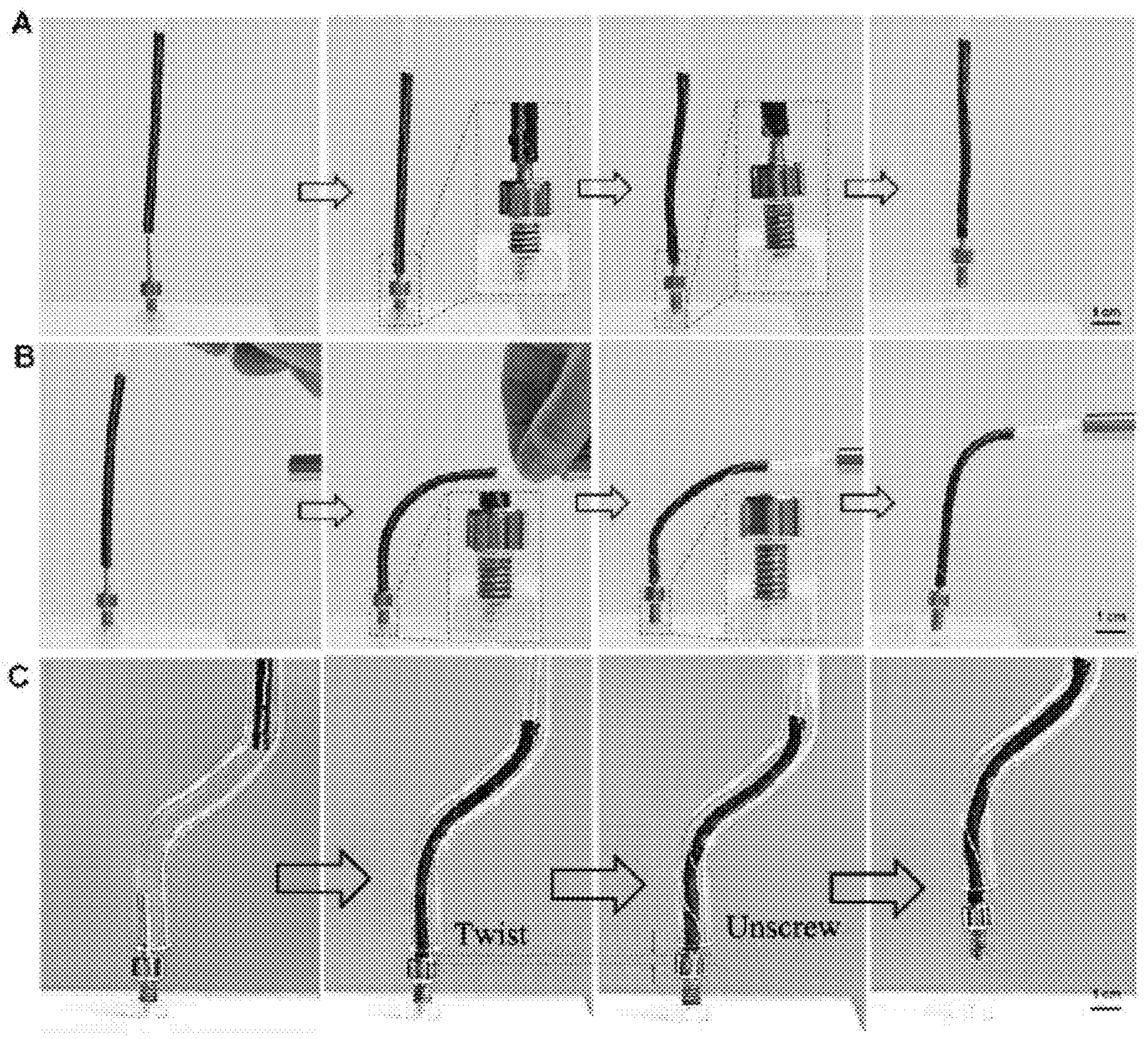
FIG. 11 shows a case that a 3D HAFMS-TSA manufactured according to the present disclosure is used as a small-scale soft-robotic tentacle to grasp and screw a screw rod.

Results were as shown in FIG. 11. Under irradiation of NIR light, the bottom of the 3D HAFMS-TSA contracted firstly and was wrapped onto the bolt tightly. The 3D HAFMS-TSA was irradiated, such that the twisting force was generated. The force was transmitted to the bolt part to unscrew the bolt. The 3D HAFMS-TSA was slowly moved upwards. The bolt was removed from a nut. The 3D HAFMS-TSA could not only grasp a bolt through photo-driven radial contraction, but also unscrew the bolt in a straight state. The 3D HAFMS-TSA exerts torque to the bolt in its curved states, even adapting to a meandering pipe to unscrew the bolt through photo-driven twisting motion although the multiple parts of the tentacle are curved.

The present disclosure is not limited to the above optimum embodiment, and anyone can obtain other products in various forms with the motivation of the present disclosure. However, no matter what change is made in its shape or structure, any technical solution identical or similar to that of the present disclosure falls within the scope of protection of the present disclosure.

What is claimed is:

1. A three-dimensional (3D) helical-artificial-fibrous-muscle structured tubular soft actuator (HAFMS-TSA), having a 3D helical fibrous architecture formed by tightly winding fibers, wherein the fibers are obtained by directionally arranging liquid crystal (LC) mesogens in a direction of an external force by mechanically stretching fibrous liquid crystal elastomer (LCE) oligomers that are formed by LC monomers but not completely crosslinked, the fibrous LCE oligomers have weak crosslinked networks formed through chemical crosslinking reactions, the stretched fibers are winded onto a mold under action of an external force, such that the fibers come into contact with each other and further crosslinked, an orientation of the LC mesogens in the fibers is fixed in a further crosslinking process, the contacted fibers are self-bonded by chemical bonds, and a HAFMS-TSA with the LC mesogens directionally arranged is obtained after the mold is removed; and wherein the LCE oligomers undergo a first partial crosslinking to form a stretchable fibrous precursor, a second chemical crosslinking upon winding, and a third further crosslinking to complete self-bonding between contacted fibers.

2. The 3D HAFMS-TSA according to claim 1, wherein the HAFMS-TSA generates combined deformations, including axial, radial and/or torsional (axial, radial and/or twisting) upon symmetric stimuli, and the axial, radial and/or torsional combined deformation comprises one type of (1) axial shortening and radial expansion; (2) twisting, axial shortening and radial expansion; (3) axial shortening, and twisting while maintaining a constant diameter; (4) axial shortening, radial contraction, and twisting; (5) axial contraction, and radial contraction while maintaining a constant axial length; (6) axial elongation, radial contraction, and twisting; and (7) axial elongation and radial contraction; and deformation of phototropic twisting and photophobic twisting upon asymmetric stimuli comprises one type of (8) bending towards a stimulus; (9) bending towards the stimulus coupled with controllable twisting; (10) bending away from the stimulus coupled with controllable twisting; and (11) bending away from the stimulus.

3. The 3D HAFMS-TSA according to claim 1, wherein a winding angle θ is formed between the fiber and a long-axis direction of the 3D HAFMS-TSA, and $0° \leq \theta \leq 90°$; (a) when $\theta=0°$, the 3D HAFMS-TSA simultaneously generates deformation of axial shortening and radial expansion upon symmetric stimuli; (b) when $0°<\theta<$a first critical boundary value ($\theta_1$), the 3D HAFMS-TSA simultaneously generates deformation of twisting, axial shortening and radial expansion upon symmetric stimuli; (c) when $0=\theta_1$, the 3D HAFMS-TSA simultaneously generates deformation of twisting and axial shortening while maintaining a constant radial diameter upon symmetric stimuli; (d) when $\theta_1<\theta<$a second critical boundary value ($\theta_2$), the 3D HAFMS-TSA simultaneously generates deformation of twisting, axial shortening and radial shortening upon symmetric stimuli; (e) when $\theta=\theta_2$, the 3D HAFMS-TSA simultaneously generates deformation of twisting and radial shortening while maintaining a constant axial length upon symmetric stimuli; (f) when $\theta_2<\theta<90°$, the 3D HAFMS-TSA simultaneously generates deformation of twisting, radial shortening and axial elongation upon symmetric stimuli; (g) when $\theta=90°$, the 3D HAFMS-TSA simultaneously generates deformation of radial shortening and axial elongation upon symmetric stimuli; (h) when $\theta=0°$, the 3D HAFMS-TSA generates deformation of bending towards a stimulus upon asymmetric stimuli; (i) when $0°<\theta<\theta_2$, the 3D HAFMS-TSA generates deformation of bending towards the stimulus coupled with controllable twisting upon asymmetric stimuli; (j) when $\theta_2<\theta<90°$, the 3D HAFMS-TSA generates deformation of bending away from the stimulus coupled with controllable twisting upon asymmetric stimuli; and (k) when $\theta=90°$, the 3D HAFMS-TSA generates deformation of bending away from the stimulus upon asymmetric stimuli.

4. The 3D HAFMS-TSA according to claim 1, wherein different parts of the fibers have different stretching ratios, and a 3D HAFMS-TSA having a gradient orientation degree is obtained.

5. The 3D HAFMS-TSA according to claim 1, wherein a winding angle $\theta$ is formed between the fiber and a long-axis direction of the 3D HAFMS-TSA; when $\theta=$a first critical boundary value ($\theta_1$), the 3D HAFMS-TSA maintains a diameter constant during stimuli-responsive deformations; and when $\theta=$a second critical boundary value ($\theta_2$), the 3D HAFMS-TSA maintains a length constant during stimuli-responsive deformations; and radial deformation or axial deformation and deformation in other directions of the 3D HAFMS-TSA in a stimulated deformation process are coupled or decoupled by adjusting and controlling the winding angle.

6. The 3D HAFMS-TSA according to claim 1, wherein the fibers at different parts are manufactured by introducing fibrous LCE oligomers of which LCE materials have different responsive formulations, and a material-programmable 3D HAFMS-TSA is obtained.

* * * * *